(12) United States Patent
Touitou et al.

(10) Patent No.: US 8,156,557 B2
(45) Date of Patent: Apr. 10, 2012

(54) PROTECTION AGAINST REFLECTION DISTRIBUTED DENIAL OF SERVICE ATTACKS

(75) Inventors: Dan Touitou, Ramat Gan (IL); Darrel Lewis, San Francisco, CA (US); Rafi Tzadikario, Kfar Saba (IL); Karen Horowitz, Hod Hasharon (IL)

(73) Assignee: Cisco Technology, Inc., San Jose, CA (US)

( * ) Notice: Subject to any disclaimer, the term of this patent is extended or adjusted under 35 U.S.C. 154(b) by 1295 days.

(21) Appl. No.: 11/650,058

(22) Filed: Jan. 4, 2007

(65) Prior Publication Data
US 2008/0168559 A1     Jul. 10, 2008

(51) Int. Cl.
*G06F 11/00* (2006.01)

(52) U.S. Cl. .................... 726/23; 370/250; 370/389

(58) Field of Classification Search .......... 714/38, 714/49, 48, 35, 37; 709/203, 217, 223, 237, 709/225, 229, 227; 726/22, 14, 13, 11, 34, 726/25, 26, 27; 380/42, 55, 58, 46
See application file for complete search history.

(56) References Cited

U.S. PATENT DOCUMENTS

| | | | |
|---|---|---|---|
| 5,067,074 A | 11/1991 | Farel et al. |
| 5,511,122 A | 4/1996 | Atkinson |
| 5,689,508 A | 11/1997 | Lyles |
| 5,805,803 A | 9/1998 | Birrell et al. |
| 5,826,014 A | 10/1998 | Coley et al. |
| 5,841,775 A | 11/1998 | Huang |
| 5,889,943 A | 3/1999 | Ji et al. |
| 5,898,830 A | 4/1999 | Wesinger et al. |
| 5,905,730 A | 5/1999 | Yang et al. |
| 5,960,170 A | 9/1999 | Chen et al. |
| 5,961,593 A | 10/1999 | Gabber et al. |
| 6,005,926 A | 12/1999 | Mashinsky |
| 6,055,236 A | 4/2000 | Nessett et al. |
| 6,072,800 A | 6/2000 | Lee |
| 6,134,217 A | 10/2000 | Stiliadis et al. |
| 6,182,226 B1 | 1/2001 | Reid et al. |
| 6,185,680 B1 | 2/2001 | Shimbo et al. |

(Continued)

FOREIGN PATENT DOCUMENTS

WO    WO 02/33870    4/2002

(Continued)

OTHER PUBLICATIONS

Bennett, J.C.R. et al. "Hierarchical Packet Fair Queueing Algorithms", 1996.

(Continued)

*Primary Examiner* — Vivek Srivastava
*Assistant Examiner* — Nega Woldemariam
(74) *Attorney, Agent, or Firm* — Baker Botts L.L.P.

(57) ABSTRACT

A method includes monitoring outgoing request packets transmitted by a node in a protected network over a link connecting the protected network to an external network. Incoming response packets that originate in the external network and are destined for transmission to the node are also monitored. One or more of the incoming response packets that were not solicited by any of the outgoing request packets are identified responsively to monitoring the outgoing request packets and the incoming response packets. A characteristic that differentiates between the identified incoming response packets and the incoming response packets that were solicited by the outgoing request packets is determined. A guard device in the external network is instructed to inhibit the transmission over the link of subsequent unsolicited response packets based on the characteristic.

20 Claims, 2 Drawing Sheets

U.S. PATENT DOCUMENTS

| | | | |
|---|---|---|---|
| 6,192,404 | B1 | 2/2001 | Hurst et al. |
| 6,208,652 | B1 | 3/2001 | Stephens et al. |
| 6,256,671 | B1 | 7/2001 | Strentzsch et al. |
| 6,279,113 | B1 | 8/2001 | Vaidya |
| 6,304,913 | B1 | 10/2001 | Rune |
| 6,314,463 | B1 | 11/2001 | Abbott et al. |
| 6,321,338 | B1 | 11/2001 | Porras et al. |
| 6,324,648 | B1 | 11/2001 | Grantges, Jr. |
| 6,335,927 | B1 | 1/2002 | Elliott et al. |
| 6,351,775 | B1 | 2/2002 | Yu |
| 6,397,335 | B1 | 5/2002 | Franczek et al. |
| 6,453,345 | B2 | 9/2002 | Trcka et al. |
| 6,487,666 | B1 | 11/2002 | Shanklin et al. |
| 6,502,135 | B1 | 12/2002 | Munger et al. |
| 6,513,122 | B1 | 1/2003 | Magdych et al. |
| 6,689,508 | B2 | 2/2004 | Sunano |
| 6,725,378 | B1 | 4/2004 | Schuba et al. |
| 6,789,203 | B1 | 9/2004 | Belissent |
| 6,795,917 | B1 | 9/2004 | Ylonen |
| 6,839,761 | B2 | 1/2005 | Kadyk et al. |
| 6,856,627 | B2 | 2/2005 | Saleh et al. |
| 6,886,102 | B1 | 4/2005 | Lyle |
| 6,907,525 | B2 | 6/2005 | Pazi et al. |
| 6,922,417 | B2 | 7/2005 | Vanlint |
| 6,934,857 | B1 | 8/2005 | Bartleson et al. |
| 7,007,302 | B1 | 2/2006 | Jagger et al. |
| 7,028,179 | B2 | 4/2006 | Anderson et al. |
| 2001/0039579 | A1 | 11/2001 | Trcka et al. |
| 2001/0042200 | A1 | 11/2001 | Lamberton et al. |
| 2002/0023227 | A1 | 2/2002 | Sheymov et al. |
| 2002/0083175 | A1 | 6/2002 | Afek et al. |
| 2002/0188862 | A1 | 12/2002 | Trethewey et al. |
| 2003/0033430 | A1 | 2/2003 | Lau et al. |
| 2003/0041091 | A1 | 2/2003 | Cheline et al. |
| 2003/0070096 | A1 | 4/2003 | Pazi et al. |
| 2003/0110274 | A1 | 6/2003 | Pazi et al. |
| 2003/0172289 | A1 | 9/2003 | Soppera |
| 2004/0003116 | A1 | 1/2004 | Munger et al. |
| 2004/0093513 | A1 | 5/2004 | Cantrell et al. |
| 2005/0089016 | A1 | 4/2005 | Zhang et al. |
| 2005/0249214 | A1* | 11/2005 | Peng .............................. 370/392 |
| 2006/0126522 | A1* | 6/2006 | Oh ................................ 370/250 |
| 2007/0192863 | A1* | 8/2007 | Kapoor et al. .................. 726/23 |

FOREIGN PATENT DOCUMENTS

| | | |
|---|---|---|
| WO | WO 03/050644 | 6/2003 |

OTHER PUBLICATIONS

Bennett, J.C.R. et al. "High Speed, Scalable, and Accuragg Implementation of Fair Queueing Algorithms in ATM Networks", 1996.

Bennett, J.C.R. et al. "WF2Q: Worst-Case Fair Weighted Fair Queueing", 1996.

Chiussi, F.M. et al. "Implementing Fair Queueing in ATM Switches: The Discrete-Rate Approach", 1998.

Chiussi, F.M. et al. "Minimum-Delay Self-Clocked Fair Queueing Algorithm for Packet-Switched Networks", 1998.

Demers, A. et al. "Analysis and Simulation of a Fair Queueing Algorithm", 1989 Association for Computing Machinery.

Eckhardt, D.A. et al. "Effort-limited Fair (ELF) Scheduling for wireless Networks", IEEE INFOCOM 2000.

Golestani, S.J. "Networks Delay Analysis of a Class of fair Queueing Algorithms", IEEE Journal on Selected Areas in Communications, vol. 13, No. 6, Aug. 1995, pp. 1057-1070.

Golestani, S.J. "A self-Clocked fair Queueing Scheme for Broadband Applications", IEEE 1994, pp. 5c.1.1-5c1.11.

Greenberg, Albert G. et al. "How Fair is Fair Queuing?" Journal of the Association for Computing Machinery vol. 39, No. 3, Jul. 1992, pp. 568-598.

Parekh, A.K.J. "A Generalized Processor Sharing Approach to Flow Control in Integrated Services Networks", Ph.D. Dissertation Massachusetts Institute of Technology, Feb. 1992.

Parekh, A.K.J. "A Generalized Processor Sharing Approach to Flow Control in Integrated Services Networks: The Multiple Node Case", IEEE/ACM Transactions on Networking vol. 2, No. 2, Apr. 1994, pp. 137-150.

Parekh, A.K.J. "A Generalized Processor Sharing Approach to Flow Control in Integrated Services Networks: The Single-Node Case", IEEE/ACM Transactions on Networking vol. 1, No. 3, Jun. 1993, pp. 344-357.

"Quality of Service Networking", downloaded from the web (address: http://www.cisco.com/univercd/cc/td/doc/cisintwk/ito_doc/qos.htm), Cisco Systems, Inc. 2002.

Rexford, J.L. et al. "Hardware Efficient Fair Queueing Architectures for high-Speed networks", IEEE 1996, pp. 5d.2.1-5d.2.9.

Shreedhar M. et al. "Efficient Fair Queueing Using Deficit Round-Robin", IEEE/ACM Transactions on networking vol. 4, No. 3, Jun. 1996, pp. 375-385.

Stiliadis, D. et al. "Frame-Based Fair Queueing: A New Traffic Scheduling Algorithm for Packet-Switched Networks", Jul. 1995, pp. 1-43.

Mockapetris, "Domain Names—Implementation and Specification", RFC 1035, 1987.

D. Eastlake, "Domain Name System Security Extensions", RFC 2535, Mar. 1999.

Mockapetris, "Domain Names—Concepts and Facilities", RFC 1034, 1987.

http://www.cisco.com/en/US/products/ps5892, 1992-2007 Cisco System, inc.

http://www.cisco.com/en/US/products/ps5894, 1992-2007 Cisco System, inc.

Roger M. Needham, et al., "Using encryption for authentication in large networks of computers", Communications of ACM, Dec. 1978, vol. 21, No. 12, pp. 993-999.

* cited by examiner

PROTECTION AGAINST REFLECTION DISTRIBUTED DENIAL OF SERVICE ATTACKS

FIELD OF THE INVENTION

The present disclosure relates generally to protection against denial of service attacks in computer networks.

BACKGROUND OF THE INVENTION

In a Denial-of-Service (DoS) attack, an attacker floods a target network or server with a large volume of message traffic. Handling this traffic consumes the available resources of the target, and eventually brings the target to a situation in which it is unable to serve its legitimate clients. Distributed DoS (DDoS) attacks are often more damaging, as they involve creating artificial network traffic from multiple sources simultaneously.

Several methods and systems for protection against DDoS attacks are known in the art. For example, Cisco Systems, Inc. (San Jose, Calif.) offer a product called Traffic Anomaly Detector XT 5600. The anomaly detector compares current network activity to profiles of known "normal" behavior, in order to detect DDoS, worm, and other attacks. The traffic anomaly detector sometimes operates in conjunction with another Cisco product called Cisco Guard XT 5650. The XT 5650 can be alerted by a traffic anomaly detector or other standards-based detection solution, such as a firewall or intrusion detection system (IDS). When alerted, the XT 5650 diverts traffic destined for a targeted device, in order to identify and block the specific packets and flows responsible for the attack while allowing legitimate transactions to pass. Information regarding the XT 5600 and XT 5650 is available at www.cisco.com/en/US/products/ps5892 and www.cisco.com/en/US/products/ps5894, respectively.

The present invention will be more fully understood from the following detailed description of the embodiments thereof, taken together with the drawings in which:

DESCRIPTION OF EXAMPLE EMBODIMENTS

Overview

A method for protecting a network node, which is located in a protected network, against reflection DDoS attacks includes monitoring outgoing request packets transmitted by the node over a link connecting the protected network to an external network. Incoming response packets that originate in the external network and are destined for transmission to the node are also monitored. Responsively to monitoring the outgoing request packets and the incoming response packets, one or more of the incoming response packets that were not solicited by any of the outgoing request packets are identified. A characteristic that differentiates between the identified incoming response packets and the incoming response packets that were solicited by the outgoing request packets is determined. A guard device in the external network is instructed to inhibit the transmission over the link of subsequent unsolicited incoming response packets based on the characteristic.

System Description

Figure 1:
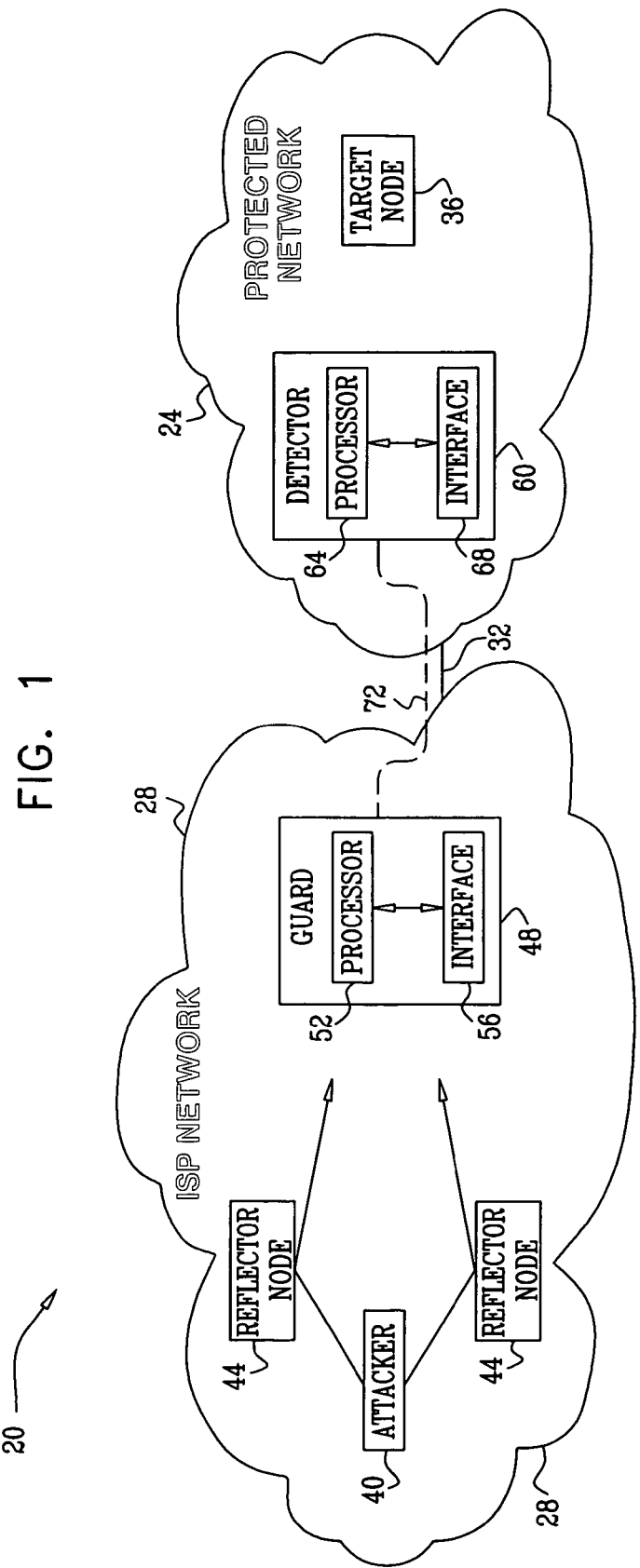
FIG. 1 is a block diagram that schematically illustrates a communication network, in accordance with an embodiment of the present invention.

FIG. 1 is a block diagram that schematically illustrates a communication network 20, in accordance with an embodiment of the present invention. System 20 comprises a protected network 24, whose nodes are protected from DDoS attacks using methods that are described in detail hereinbelow. Network 24 may comprise a local area network (LAN) operated by an enterprise, or any other type of network.

Network 24 is connected to an external network 28 by a communication link 32. Network 28 may comprise a single network or multiple connected networks. Typically but not necessarily, network 28 comprises an access network that provides Internet access to the nodes of network 24, and is operated by an Internet service provider (ISP). Network 28 may comprise a public network such as the Internet, an access network operated by an ISP, or a combination of such networks. Networks 24 and 28 typically comprise Internet Protocol (IP) networks.

Protected network 24 may comprise multiple nodes, such as servers, switches, routers, user workstations and/or any other suitable network nodes. The description that follows focuses on a particular target node 36 in network 24. The methods and systems described herein may be used, however, to protect any desired number of nodes, or even all nodes of network 24. Target node 36 is also referred to as a protected node.

Target node 36 may be subject to a reflection DDoS attack, which is initiated by an attacker node 40 in network 28. In a reflection DDoS attack, the attacker sends multiple request packets to one or more innocent nodes in network 28, which are referred to as reflector nodes 44. The IP headers of the request packets sent by the attacker to the reflector nodes are forged to contain the IP address of target node 36 as the source IP address. As a result, when the reflector nodes reply to these forged requests, their response packets are sent to the target node. Thus, the target node is flooded with a large number of illegitimate false response packets sent by the reflector nodes.

For example, the requests sent by the attacker may comprise Transmission Control Protocol (TCP) SYN requests, in which case the reflector nodes flood the target node with multiple TCP SYNACK packets. As another example, the attacker may send multiple Domain Name Service (DNS) requests to DNS servers, which respond with multiple DNS replies that flood the target node. Generally, the term "request packet" is used to describe any type of packet that solicits a response from the node receiving the packet. Other types of request and response packet types may comprise, for example, Internet Control Message Protocol (ICMP) echo request and echo reply packets.

Known DDoS detection methods and systems are often unable to detect and suppress reflection DDoS attacks. The false response packets sent from the reflector nodes to the target node are not spoofed, i.e., the source IP addresses of these packets genuinely represent the nodes that sent them. Thus, anti-spoofing methods, which attempt to identify spoofed source IP addresses, will normally not detect the attack.

Since the attacker may use a large number of reflectors and send a relatively small number of requests to each reflector, methods based on anomaly detection are unlikely to sense a suspiciously large traffic volume originating from any single source.

Moreover, since the reflector nodes are usually innocent, legitimate nodes, blocking all traffic originating from these nodes may deny legitimate services from the target node.

The volume of traffic transmitted in a reflection DDoS attack is often high enough to saturate link 32, which connects network 24 with network 28. It is therefore desirable to block the false response packets sent by the reflector nodes within network 28, before they reach link 32. Some known protection devices and methods, such as firewalls, intrusion detection systems (IDS) and intrusion protection systems (IPS), which are normally located in protected network 24, cannot perform this task.

Embodiments of the present invention provide methods and systems for detecting reflection DDoS attacks and blocking the attack traffic before it reaches the protected network. A guard device 48 is located in ISP network 28. When alerted, the guard diverts the traffic addressed to the target node, so that all such traffic passes through the guard. The guard transfers the traffic addressed to the target node selectively, attempting to inhibit the delivery of the false response packets and transfer only legitimate traffic. In some cases, the guard may divert and filter traffic that is addressed to multiple target nodes.

Inhibiting the delivery of the false response packets often comprises discarding the false response packets. Alternatively, the guard may forward the false response packets with a lower priority, as long as this traffic does not affect the capacity of link 32 or the target node. Additionally or alternatively, the guard may limit the rate at which the false responses are forwarded to a very low rate, so as not to affect the capacity of link 32 or the target node.

Guard 48 comprises a guard processor 52, which carries out the traffic diversion and filtering methods described herein, and a network interface 56, which communicates with other nodes in networks 24 and 28. In some embodiments, guard 48 may comprise a Cisco XT 5650 device, cited above, which is configured or adapted to carry out the methods described herein. Some of the functions of guard 48 may be carried out using hardware or firmware, such as using application-specific integrated circuits (ASICs) and/or field-programmable gate arrays (FPGAs). Other functions may be implemented using software, or a combination of hardware and software elements.

In many cases, such as when guard 48 shares its capacity among multiple potential target nodes, the guard is configured to monitor only inbound packets that are sent from network 28 toward the target node, and cannot monitor outbound packets, i.e., packets sent from the target node to the ISP network. Therefore, when the guard receives a response packet sent from a node in network 28 to the target node, the guard cannot verify whether this reply was genuinely sent in response to a request from the target node. In other words, because the guard monitors traffic in only one direction, it cannot differentiate between legitimate and false responses, and cannot reliably detect reflection DDoS attacks.

In order to detect reflection DDoS attack traffic, a detector device 60 is installed in protected network 24. Detector 60 is located in the protected network and not in the ISP network in order to enable the detector to monitor both traffic directions, i.e., packets sent from target node 36 to network 28 and vice versa. Monitoring bidirectional traffic by a node in the ISP network would require either an in-line configuration in which all traffic traverses the monitoring node, or a mechanism that sends a copy of both traffic directions to the monitoring node. These alternatives are not scalable and are impractical in many network configurations.

The detector in the protected network can monitor traffic using port spanning methods, port mirroring methods, physical wire tapping, or any other suitable traffic monitoring method or mechanism. The detector compares the inbound packets with the outbound packets, and attempts to detect response packets that were not solicited by corresponding request packets. Detecting one or more unsolicited response packets is often an indication that a reflection DDoS attack is in progress.

Upon detecting a reflection DDoS attack, detector 60 alerts guard 48, and the guard diverts and filters the inbound traffic. In some embodiments, the detector produces differentiation characteristics, which assists the guard in differentiating between legitimate and illegitimate traffic. The differentiation characteristics may be either positive or negative, i.e., assist in identifying either the legitimate traffic or the illegitimate traffic. The detector provides the differentiation characteristics to the guard device, and the guard uses this information in its packet filtering process.

Detector 60 comprises a detector processor 64, which carries out the detection and traffic characterization methods described herein, and a network interface 68, which communicates with other nodes in networks 24 and 28. In some embodiments, detector 60 may comprise a Cisco Traffic Anomaly Detector XT 5600 device, cited above, which is adapted to carry out the methods described herein. Some of the functions of detector 60 may be carried out using hardware or firmware, such as using ASICs and/or FPGAs. Other functions may be implemented using software, or a combination of hardware and software elements.

Guard 48 and detector 60 communicate with one another using a communication channel 72, typically comprising a logical connection defined over link 32. Channel 72 may comprise, for example, a dedicated out-of-band link, a User Datagram Protocol (UDP)-based alert protocol, a Multi-Protocol Label Switching (MPLS) tunnel, or any other suitable communication connection that enables guard 48 and detector 60 to communicate.

In some embodiments, guard processor 52 and/or detector processor 64 comprise general-purpose processors, which are programmed in software to carry out the functions described herein. The software may be downloaded to the processors in electronic form, over a network, for example, or it may alternatively be supplied to the processors on tangible media, such as CD-ROM.

Protection Method Description

Figure 2:
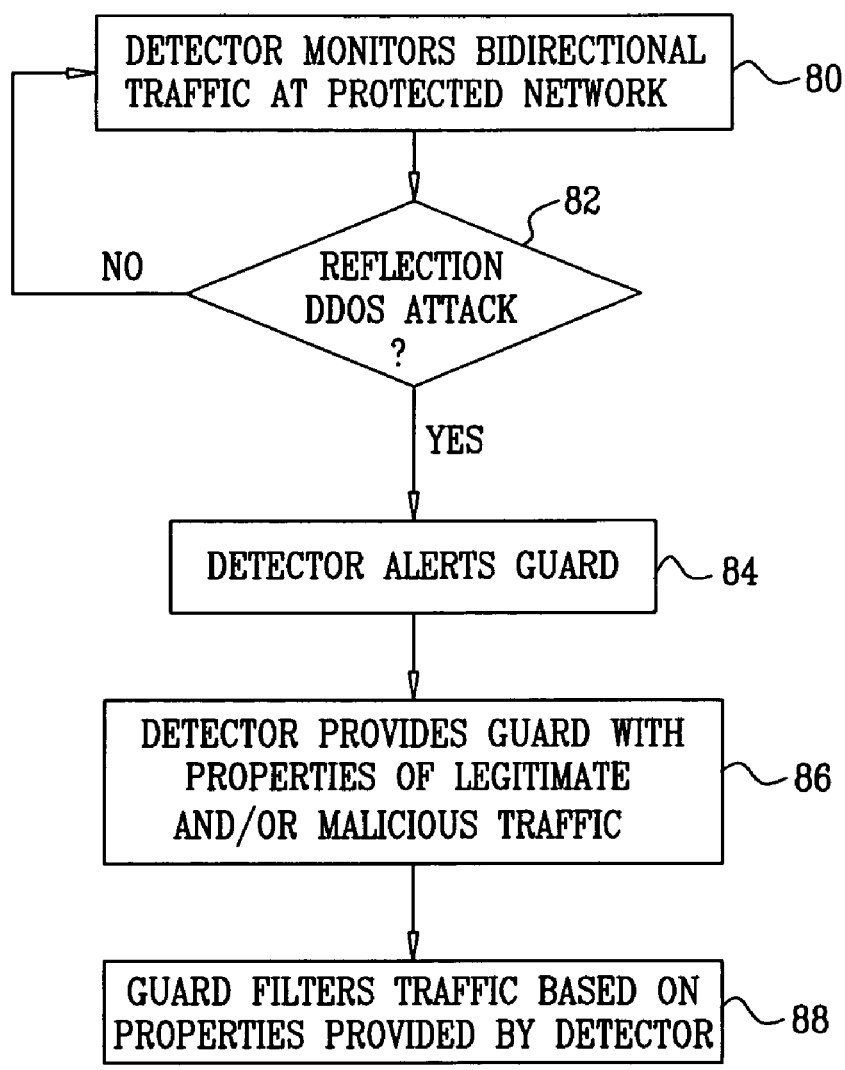
FIG. 2 is a flow chart that schematically illustrates a method for protection against reflection DDoS attacks, in accordance with an embodiment of the present invention.

FIG. 2 is a flow chart that schematically illustrates a method for protection against DDoS reflection attacks, in accordance with an embodiment of the present invention. The method begins with detector 60 monitoring the inbound and outbound packets exchanged between networks 24 and 28, at a monitoring step 80. The detector may monitor all traffic exchanged between the two networks, or only part of the traffic. For example, if a particular node or group of nodes in network 24 is particularly sensitive or is likely to become a target for attacks, the detector can be configured to monitor the traffic exchanged with these nodes.

The detector compares the inbound packets with the outbound packets. In particular, the detector monitors different request packets sent from network 24 toward network 28, and response packets sent in the opposite direction. For each response packet sent from network 28 to network 24, the detector determines whether or not the response was solicited by a request packet sent from a node in network 24.

For example, in some embodiments the detector caches copies of all outbound request packets in a memory. When an inbound response arrives, the detector attempts to find a matching cached request, which solicited this response. The matching response should be of the same service type as the request (i.e., a DNS response in response to a DNS request). In some cases, the request should have a source IP address that matches the destination IP address of the response. In some cases, legitimate responses have an identifier that matches a corresponding identifier in the request. Such identifier may comprise, for example a sequential number assigned to the request.

If a matching request is found, the detector deletes this request from the cache. If none of the cached outbound requests matches the inbound response packet, the detector concludes that the response packet is illegitimate, and may be part of a reflection DDoS attack. Alternatively, the detector can use any other method or criterion for matching inbound response packets to outbound requests.

The detector evaluates whether a reflection DDoS attack is in progress, at an attack checking step 82. In some embodiments, the detector triggers an attack detection when a certain number of unsolicited responses arrive within a predetermined time interval. Alternatively, the detector can measure the ratio between incoming responses and outgoing requests. For example, the detector may count the requests and responses that occur in a predetermined time interval. An exceedingly high ratio may be indicative of a reflection DDoS attack. This technique is memory-efficient, since the detector tracks only the number of requests and responses, and does not cache the request packets themselves. In some embodiments, the detector may start caching packets, such as packets exchanged with a particular target node, when an attack is detected. Further alternatively, the detector can use any other suitable method or criterion for triggering an attack detection.

If the detector determines that no attack is in progress, the method loops back to monitoring step 80 above, and the detector continues to monitor the traffic exchanged between networks 24 and 28. Otherwise, the detector triggers an attack detection, and alerts guard 48, at an alerting step 84. The detector sends the alert to guard 48 over link communication channel 72.

When detecting an attack, the detector analyzes the inbound and/or outbound traffic in an attempt to characterize the attack and/or the legitimate traffic. The detector produces differentiation characteristics, in order to assist and direct the guard's packet filtering process. The detector sends the differentiation characteristics to the guard over channel 72, at a notification step 86. The guard filters the inbound traffic using the differentiation characteristics provided by the detector, and forwards the filtered traffic to network 24, at a selective forwarding step 88.

For example, the detector may determine the destination IP addresses and/or TCP/UDP ports, which are under attack. The detector then reports these IP addresses and/or TCP/UDP ports to the guard, and the guard blocks all packets addressed to these addresses and/or ports.

Additionally or alternatively, the detector may send to the guard "pinhole information," i.e., information regarding legitimate requests, which were sent by the target node. In response, the guard "opens a pinhole," i.e., allows traffic associated with the legitimate request to pass.

In some cases, the detector notifies the guard of each legitimate request sent by the target node. The guard then allows the responses solicited by these legitimate requests, and the subsequent traffic associated with the requested service, to pass. In other cases, the detector may notify the guard of the servers to which the target node sent legitimate requests, rather than reporting each individual request. In these cases, the guard typically allows traffic from these servers to pass for a limited time duration.

In some embodiments, the detector can characterize the illegitimate response packets and generate a signature, i.e., a representative pattern that is indicative of the illegal responses. For example, the detector may generate one or more regular expressions, which are typical of illegitimate responses. In these embodiments, the guard uses a regular expression filter for differentiating between legitimate and illegitimate packets. Some aspects of signature extraction and generation methods are described in U.S. patent application Ser. No. 10/992,265, filed Nov. 19, 2004, whose disclosure is incorporated herein by reference.

Additionally or alternatively, the detector can produce and report any other suitable information or characteristics, which assist the guard in differentiating between legitimate and illegitimate packets. The guard can apply any suitable filtering method for selectively forwarding packets to network 24, using the information provided by the detector.

The differentiation characteristics provided by the detector enables the guard to react selectively, i.e., block illegitimate traffic while reducing the disturbance to legitimate services. In many cases, the methods and systems described herein enable the guard to differentiate between legitimate and illegitimate traffic, even when both traffic types originate from the same server. In other words, when a node, which provides a legitimate service to the target node, is also used maliciously by the attacker as a reflector node, the methods and systems described herein can block the reflection attack traffic while allowing the legitimate traffic to pass.

Thus, the methods and systems described herein provide accurate and effective protection against reflection DDoS attacks. Since the guard device is located in the ISP network, the attack traffic is blocked before reaching and saturating the link that connects the ISP network with the protected network.

Although the embodiments described herein mainly address a guard device alerted by a detector device, the guard device can also be alerted by other elements located in network 24, such as firewalls, intrusion detection systems (IDSs) and intrusion prevention systems (IPSs). In some embodiments, the detection and alerting functions can be implemented in the target node itself, such as in the network interface card (NIC) of the target node.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method comprising:
monitoring outgoing request packets transmitted by a node in a protected network over a link connecting the protected network to an external network;
monitoring incoming response packets that originate in the external network and are destined for transmission to the node;
responsively to monitoring the outgoing request packets and the incoming response packets, identifying one or more of the incoming response packets that were not solicited by any of the outgoing request packets;

determining a characteristic that differentiates between the identified incoming response packets and the incoming response packets that were solicited by the outgoing request packets; and instructing a guard device in the external network to inhibit the transmission over the link of subsequent unsolicited response packets based on the characteristic.

2. The method according to claim 1, wherein monitoring the outgoing request packets and the incoming response packets comprises monitoring the packets using a detector device in the protected network, and wherein instructing the guard device comprises sending an alert message from the detector device in the protected network to the guard device in the external network.

3. The method according to claim 2, wherein sending the alert message comprises sending the message via a dedicated communication channel.

4. The method according to claim 1, wherein the outgoing request packets comprise Transmission Control Protocol (TCP) SYN request packets, and wherein the incoming response packets comprise TCP SYNACK packets.

5. The method according to claim 1, wherein the outgoing request packets comprise Domain Name Service (DNS) request packets, and wherein the incoming response packets comprise DNS response packets.

6. The method according to claim 1, wherein the outgoing request packets comprise Internet Control Message Protocol (ICMP) echo request packets, and wherein the incoming response packets comprise ICMP echo reply packets.

7. The method according to claim 1, wherein determining the characteristic comprises determining at least one destination parameter selected from a group of parameters consisting of a destination address and a destination port of the identified response packets, and wherein instructing the guard device comprises causing the guard device to inhibit the transmission of subsequent packets comprising the determined at least one destination parameter.

8. The method according to claim 1, wherein determining the characteristic comprises identifying the response packets that were solicited by the outgoing request packets, and wherein instructing the guard device comprises causing the guard device to allow the transmission of subsequent packets associated with the response packets that were solicited by the outgoing request packets, while inhibiting the transmission of the subsequent packets not associated with the response packets that were solicited by the outgoing request packets.

9. The method according to claim 1, wherein determining the characteristic comprises identifying one or more network nodes in the external network sending the response packets that were solicited by the outgoing request packets, and wherein instructing the guard device comprises causing the guard device to allow the transmission of subsequent packets originating from the identified one or more network nodes for a limited time duration.

10. The method according to claim 1, wherein determining the characteristic comprises generating a signature characterizing the response packets that were solicited by the outgoing request packets, and wherein instructing the guard device comprises causing the guard device to inhibit the transmission of subsequent packets that match the signature.

11. An apparatus comprising:
a network interface, which is arranged to monitor outgoing request packets transmitted by a node in a protected network over a link connecting the protected network to an external network, and to monitor incoming response packets that originate in the external network and are destined for transmission to the node; and a processor, which is arranged to identify, responsively to monitoring the outgoing request packets and the incoming response packets, one or more of the incoming response packets that were not solicited by any of the outgoing request packets, to determine a characteristic that differentiates between the identified incoming response packets and incoming response packets that were solicited by the outgoing request packets, and to instruct a guard device in the external network to inhibit the transmission over the link of subsequent unsolicited response packets based on the characteristic.

12. The apparatus according to claim 11, wherein the network interface is connected to the protected network, and wherein the processor is arranged to instruct the guard device by sending an alert message from the protected network to the guard device in the external network.

13. The apparatus according to claim 11, wherein the characteristic comprises at least one destination parameter selected from a group of parameters consisting of a destination address and a destination port of the identified response packets, and wherein the processor is arranged to cause the guard device to inhibit the transmission of subsequent packets comprising the at least one destination parameter.

14. The apparatus according to claim 11, wherein the characteristic comprises an identification of the response packets that were solicited by the outgoing request packets, and wherein the processor is arranged to cause the guard device to allow the transmission of subsequent packets associated with the response packets that were solicited by the outgoing request packets, while inhibiting the transmission of the subsequent packets not associated with the response packets that were solicited by the outgoing request packets.

15. The apparatus according to claim 11, wherein the characteristic comprises an identification of one or more network nodes in the external network sending the response packets that were solicited by the outgoing request packets, and wherein the processor is arranged to cause the guard device to allow the transmission of subsequent packets originating from the identified one or more network nodes for a limited time duration.

16. The apparatus according to claim 11, wherein the processor is arranged to generate a signature characterizing the identified response packets and to provide the signature to the guard device, in order to cause the guard device to inhibit the transmission of subsequent packets that match the signature.

17. A system comprising:
a detector device, which is arranged to monitor outgoing request packets transmitted by a node in a protected network over a link connecting the protected network to an external network, to monitor incoming response packets that originate in the external network and are destined for transmission to the node, to identify, responsively to monitoring the outgoing request packets and the incoming response packets, one or more of the incoming response packets that were not solicited by any of the outgoing request packets, to determine a characteristic that differentiates between the identified incoming response packets and incoming response packets that were solicited by the outgoing request packets, and to send an alert comprising the characteristic; and a guard device, which is located in the external network and is arranged to accept the alert from the detector device, and to inhibit the transmission over the link of subsequent unsolicited response packets based on the characteristic.

18. The system according to claim 17, wherein the detector device is located in the protected network and is arranged to send the alert to the guard device in the external network.

19. The system according to claim 17, wherein the characteristic comprises an identification of one or more network nodes in the external network sending the response packets that were solicited by the outgoing request packets, and wherein the guard device is arranged to allow the transmission of subsequent packets originating from the identified one or more network nodes for a limited time duration.

20. The system according to claim 17, wherein the detector device is arranged to generate a signature characterizing the identified response packets and to provide the signature to the guard device, and wherein the guard device is arranged to inhibit the transmission of subsequent packets that match the signature.

* * * * *